(12) United States Patent
Buthmann

(10) Patent No.: US 12,060,894 B2
(45) Date of Patent: *Aug. 13, 2024

(54) PUMP ASSEMBLY

(71) Applicant: KSB SE & Co. KGaA, Frankenthal (DE)

(72) Inventor: Lukas Buthmann, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 83 days.

This patent is subject to a terminal disclaimer.

(21) Appl. No.: 17/597,244

(22) PCT Filed: Jul. 1, 2020

(86) PCT No.: PCT/EP2020/068519
§ 371 (c)(1),
(2) Date: Dec. 30, 2021

(87) PCT Pub. No.: WO2021/001422
PCT Pub. Date: Jan. 7, 2021

(65) Prior Publication Data
US 2022/0316495 A1 Oct. 6, 2022

(30) Foreign Application Priority Data

Jul. 1, 2019 (DE) ...................... 10 2019 004 538.6
Dec. 10, 2019 (DE) ...................... 10 2019 008 561.2

(Continued)

(51) Int. Cl.
*F04D 29/58* (2006.01)
*B22D 25/02* (2006.01)
(Continued)

(52) U.S. Cl.
CPC ............ *F04D 29/588* (2013.01); *B22F 10/25* (2021.01); *B22F 12/38* (2021.01); *F04D 1/00* (2013.01);
(Continued)

(58) Field of Classification Search
CPC ........ F04D 29/588; F04D 1/00; F04D 29/426; F04D 29/586; F04D 29/026;
(Continued)

(56) References Cited

U.S. PATENT DOCUMENTS

RE19,826 E * 1/1936 Aisenstein .............. F04D 1/063
  415/100
2,181,677 A * 11/1939 Whittome ................. F04D 1/02
  417/356

(Continued)

FOREIGN PATENT DOCUMENTS

CN 203867983 U 10/2014
EP 2 713 058 A1 4/2014
(Continued)

OTHER PUBLICATIONS

International Search Report (PCT/ISA/210) issued in PCT Application No. PCT/EP2020/068519 dated Mar. 22, 2021 with English translation (eight (8) pages).

(Continued)

*Primary Examiner* — Hoang M Nguyen
(74) *Attorney, Agent, or Firm* — Crowell & Moring LLP

(57) ABSTRACT

A pump assembly, in particular a centrifugal pump assembly, includes a hydraulic housing having an intake port, a pressure port, a flow chamber at least partly delimited by the hydraulic housing. The hydraulic housing includes has an inner wall at least partially delimiting the flow chamber and (Continued)

an outer wall at an axial distance from the inner wall. A temperature-control chamber is located between the inner wall and outer wall.

19 Claims, 6 Drawing Sheets

(30) Foreign Application Priority Data

Jun. 30, 2020 (DE) .................... 10 2020 003 928.6
Jun. 30, 2020 (DE) .................... 10 2020 003 929.4

(51) Int. Cl.
| | |
|---|---|
| *B22F 10/25* | (2021.01) |
| *B22F 10/28* | (2021.01) |
| *B22F 12/00* | (2021.01) |
| *B22F 12/53* | (2021.01) |
| *B33Y 80/00* | (2015.01) |
| *F04D 1/00* | (2006.01) |
| *F04D 29/42* | (2006.01) |

(52) U.S. Cl.
CPC ......... *F04D 29/426* (2013.01); *F04D 29/586* (2013.01); *B22D 25/02* (2013.01); *B22F 10/28* (2021.01); *B22F 12/53* (2021.01); *B33Y 80/00* (2014.12)

(58) Field of Classification Search
CPC ...... F04D 15/0263; B22F 10/25; B22F 12/38; B22F 10/28; B22F 12/53; B22F 5/10; B22D 25/02; B33Y 80/00; B33Y 10/00; Y02P 10/25; F05D 2260/31; F05D 2230/211
USPC ................................................. 415/203, 206
See application file for complete search history.

(56) References Cited

U.S. PATENT DOCUMENTS

| | | | | |
|---|---|---|---|---|
| 3,802,804 | A | * | 4/1974 | Zimmermann ....... F04D 13/026 417/420 |
| 3,936,220 | A | | 2/1976 | Henderson |
| 5,752,803 | A | * | 5/1998 | Wetzel .................. F04D 29/426 415/199.1 |
| 2005/0013689 | A1 | | 1/2005 | Racer et al. |
| 2005/0053499 | A1 | * | 3/2005 | Cooper .................... F04D 7/00 417/313 |
| 2006/0171801 | A1 | | 8/2006 | Manabe et al. |
| 2007/0000648 | A1 | | 1/2007 | Crocker et al. |
| 2016/0245291 | A1 | | 8/2016 | Carnes |
| 2018/0320703 | A1 | * | 11/2018 | Lopes ..................... F04D 29/42 |

FOREIGN PATENT DOCUMENTS

| | | |
|---|---|---|
| FR | 2 008 305 A1 | 1/1970 |
| FR | 2 288 891 A1 | 5/1976 |
| JP | 2015-143476 A | 8/2015 |
| WO | WO 2016/116428 A1 | 7/2016 |
| WO | WO 2019/023095 A1 | 1/2019 |

OTHER PUBLICATIONS

German-language Written Opinion (PCT/ISA/237) issued in PCT Application No. PCT/EP2020/068519 dated Mar. 22, 2021 (17 pages).

International Preliminary Report on Patentability (PCT/IB/373) issued in PCT Application No. PCT/EP2020/068519 dated Dec. 28, 2021, including English translation (German-language Written Opinion (PCT/ISA/237), filed on Dec. 30, 2021 (24 pages).

* cited by examiner

PUMP ASSEMBLY

BACKGROUND AND SUMMARY OF THE INVENTION

The invention relates to a pump arrangement, in particular to a centrifugal pump arrangement, having a hydraulic casing, having a suction pipe which is formed on the hydraulic casing, having a pressure pipe which is formed on the hydraulic casing, having a flow chamber which is defined at least partially by the hydraulic casing, and having an impeller which is arranged in the flow chamber and can be driven about an axis of rotation via an impeller shaft.

Pump arrangements of this type are used in many areas, for example in building technology, for the conveyance of water or wastewater, in energy technology or often also in industrial plants, in particular in chemistry and petrochemistry. In chemistry or petrochemistry, it is frequently the case that media which can only be conveyed or pumped at a specific temperature are pumped or conveyed.

Such a medium is for example sulfur. If the temperature drops or rises too greatly at certain points in the pump during the pumping process, the medium can crystallize out and thus cause the pump to run dry. Furthermore, crystallizing out in this manner can also contaminate the conveyed medium.

Another example is conveying heavy oil or bitumen. To convey these media, the pumps used must be preheated for example at very low temperatures in order to prevent the pump from running dry, since, without prior heating, heavy oil and bitumen are too viscous to be pumped.

Inter alia in the case of process pumps, precise control of the temperature is critically important, since fluctuating temperatures can disrupt an entire plant process.

Known heatable spiral casings have the disadvantage that they consist of a plurality of individual parts which are usually interconnected by welding. If the weld points are not welded correctly, leakages can occur at these points, which substantially impairs the function of the pump.

In addition, in the case of welded constructions of this type, it is difficult to uniformly control the temperature of the whole casing including the flanges.

In conventional pumps, the forces and moments on the pipes and the inlet and outlet openings can deform the casing and lead to the impeller running onto adjacent components of the pump. Therefore, for pumps, it is generally also necessary to ensure a sufficiently thick wall thickness, in order for the casing to be able to withstand the different pressures during operation. Consequently, lightweight pumps are barely producible.

The present invention addresses the problem of reducing or even completely remedying the deficiencies of the devices known from the prior art. More specifically, the problem addressed by the present invention is that of providing a pump arrangement which has a particularly low mass or by means of which the conveying of media at an optimum conveying temperature is ensured.

This problem is solved by a pump arrangement having the feature of claim 1, according to which the hydraulic casing comprises a support structure.

So that the hydraulic casing having a relatively thin outer wall can reliably withstand the pressure inside, the hydraulic casing advantageously comprises a support structure. The support structure absorbs the forces and moments occurring on suction pipes and pressure pipes and dissipates them. In addition, the hydraulic casing is reinforced while maintaining a minimal operating weight, as a result of which the risk of the impeller dragging against a split ring which is conventionally accommodated in the hydraulic casing, or against part of the hydraulic casing, is minimized. The support structure formed on the outer wall by accumulation of material thus supports and relieves pressure on the relatively thin outer wall of the hydraulic casing.

In this case, it is particularly advantageous for the support structure to interconnect defined construction elements of the hydraulic casing, in particular casing feet, suction pipes, pressure pipes and connection points, to which additional components of the pump arrangement can be fixed.

Another advantageous embodiment provides that the support structure comprises substantially horizontally, vertically and diagonally extending accumulations of material which form interconnection or intersection points.

It has proven to be particularly advantageous for free ends of the support structure to comprise blind holes for receiving suitable fixing means, in particular screws or threaded bolts. In this case, internal threads are advantageously provided, into which the fixing means can be screwed.

In one particular embodiment, the hydraulic casing comprises an inner wall defining the flow chamber, and an outer wall which is at a distance from the inner wall, the inner wall and outer wall forming a temperature-control chamber.

In order to achieve a uniform temperature on the inner wall of the hydraulic casing, the temperature-control chamber extends between the inner wall and outer wall and substantially over the part of the inner wall defining the flow chamber.

In this case, it has proven to be particularly advantageous when, in the temperature-control chamber, there is at least one channel extending in a circular shape arranged substantially concentrically with the axis of rotation.

It has proven to be particularly advantageous when, in the temperature-control chamber, a plurality of struts are provided which connect the inner wall to the outer wall and form channels extending in a circular shape arranged substantially concentrically with the axis of rotation. It is thereby ensured that, even when a channel or even a plurality of channels is/are blocked, the hydraulic casing can be further heated or cooled.

So that all the channels can be flowed through at the same time, a first collection chamber and a second collection chamber are formed in the temperature-control chamber, which collection chambers, starting from a region close to the suction pipe, comprise a substantially radial extension, in particular towards the pressure pipe.

The fact that a third collection chamber is formed in a radially extending region which lies below the suction pipe means that complete emptying of the channels when necessary is simplified.

So that the cooling or heating medium can be supplied to or discharged from the temperature-control chamber in a user-friendly manner, a first connecting device is provided on the pressure pipe for a supply line, by means of which device the cooling or heating medium flows into the temperature-control chamber in order to control the temperature of the hydraulic casing. Furthermore, a second connecting device is provided on the pressure pipe to connect a supply line, by means of which the cooling or heating medium flows back out of the temperature-control chamber.

In order to ensure, when necessary, that the temperature-control chamber is completely emptied in a simple manner, the hydraulic casing comprises a third connecting device connected to the third collection chamber for connecting an additional line.

Advantageously, the at least one channel or channels comprise a defined structure which is used to maximize turbulence in the cooling or heating medium and thus to maximize the heat exchange.

Another problem addressed by the present invention consists in providing a method for producing a hydraulic casing for a pump arrangement as an integral component by means of 3D-printing, in particular metal 3D-printing, selective laser melting (SLM) or by means of precision casting.

Further advantages, features and effects of the present invention can be found in the following drawings.

DETAILED DESCRIPTION

Figure 1:
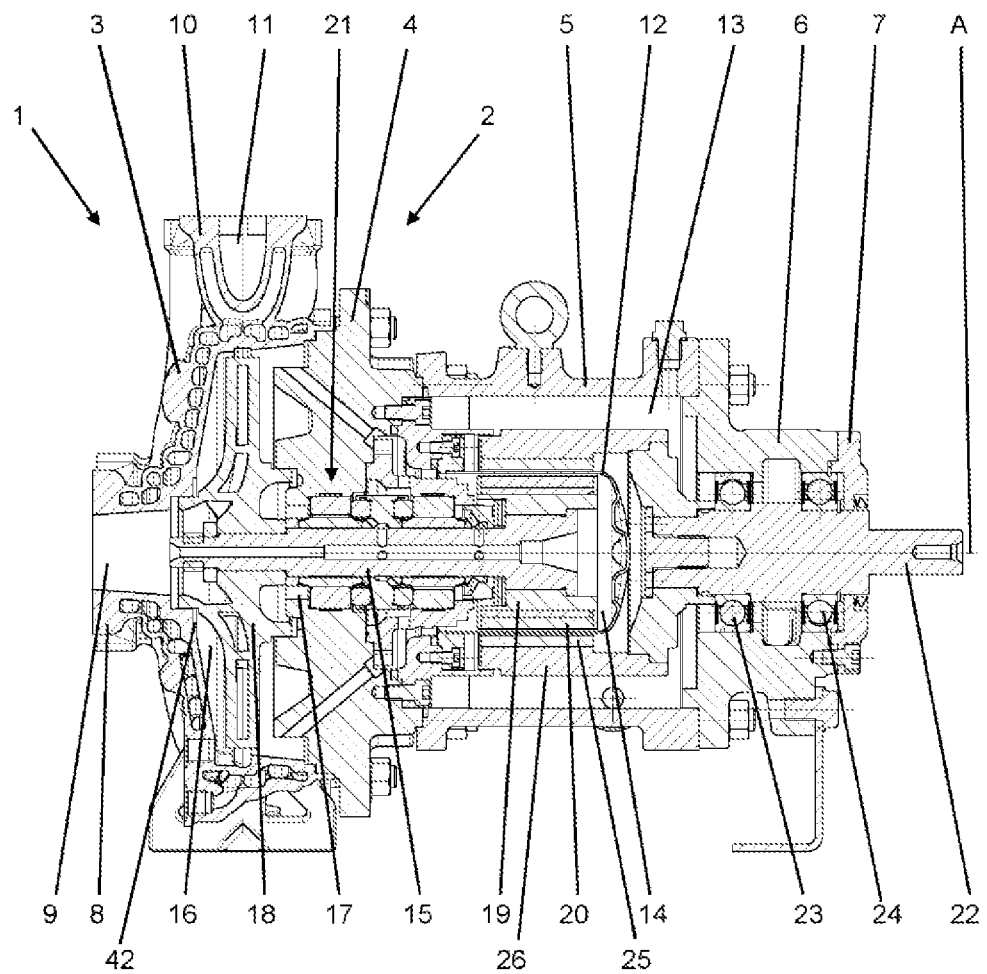
FIG. 1 is a longitudinal sectional view through a pump arrangement with a hydraulic casing according to an embodiment of the invention.

FIG. 1 shows a pump arrangement 1 in the form of a magnetic drive pump arrangement. The pump arrangement 1 comprises a multi-part pump casing 2 of a centrifugal pump which comprises a casing component in the form of a hydraulic casing 3, a casing cover 4, a bearing carrier base 5, a bearing carrier 6 and a bearing cover 7.

The hydraulic casing 3 comprises an inlet opening 9 on a suction pipe 8 for sucking in a conveying medium, and an outlet opening 11 on a pressure pipe 10 for ejecting the conveying medium. The casing cover 4 is arranged on the side of the hydraulic casing 3 which is opposite the inlet opening 9. The bearing carrier base 5 is fixed to the side of the casing cover 4 which faces away from the hydraulic casing 3. The bearing carrier 6 is attached to the side of the bearing carrier base 5 which is opposite the casing cover 4. In turn, the bearing cover 7 is fixed to the side of the bearing carrier 6 which faces away from the bearing carrier base 5.

A separating can 12 is fixed to the side of the casing cover 4 which faces away from the hydraulic casing 3 and extends at least in part through an interior 13 which is delimited by the pump casing 2, in particular by the casing cover 4, the bearing carrier base 5 and the bearing carrier 6. The separating can 12 hermetically seals a chamber 14, surrounded by the separating can, with respect to the interior 13.

An impeller shaft 15 which is rotatable about an axis of rotation A extends from a flow chamber 16 delimited by means of the hydraulic casing 3 and the casing cover 4 through an opening 17 provided in the casing cover 4 into the chamber 14.

An impeller 18 is fixed to a shaft end, located inside the flow chamber 16, of the impeller shaft 15, and an inner rotor 19 which is arranged inside the chamber 14 is arranged at the opposite shaft end. The inner rotor 19 is equipped with a plurality of magnets 20 which are arranged on the side of the inner rotor 19 facing the separating can 12.

A bearing arrangement 21 which is operatively connected to the impeller shaft 15, which is rotatably drivable about the axis of rotation A, is arranged between the impeller 18 and the inner rotor 19.

A drive motor (not shown), preferably an electric motor, drives a drive shaft 22. The drive shaft 22, which is rotatably drivable about the axis of rotation A, is arranged substantially coaxially with the impeller shaft 15. The drive shaft 22 extends through the bearing cover 7 and the bearing carrier 6 and is mounted in two ball bearings 23, 24 accommodated in the bearing carrier 6. An outer rotor 26 which supports a plurality of magnets 25 is arranged at the free end of the drive shaft 22. The magnets 25 are arranged on the side of the outer rotor 26 facing the separating can 12. The outer rotor 26 extends at least in part over the separating can 12 and interacts with the inner rotor 19 in such a way that the rotating outer rotor 26, by means of magnetic forces, also sets the inner rotor 19 and thus the impeller shaft 15 and the impeller 18 into rotation.

Figure 2:
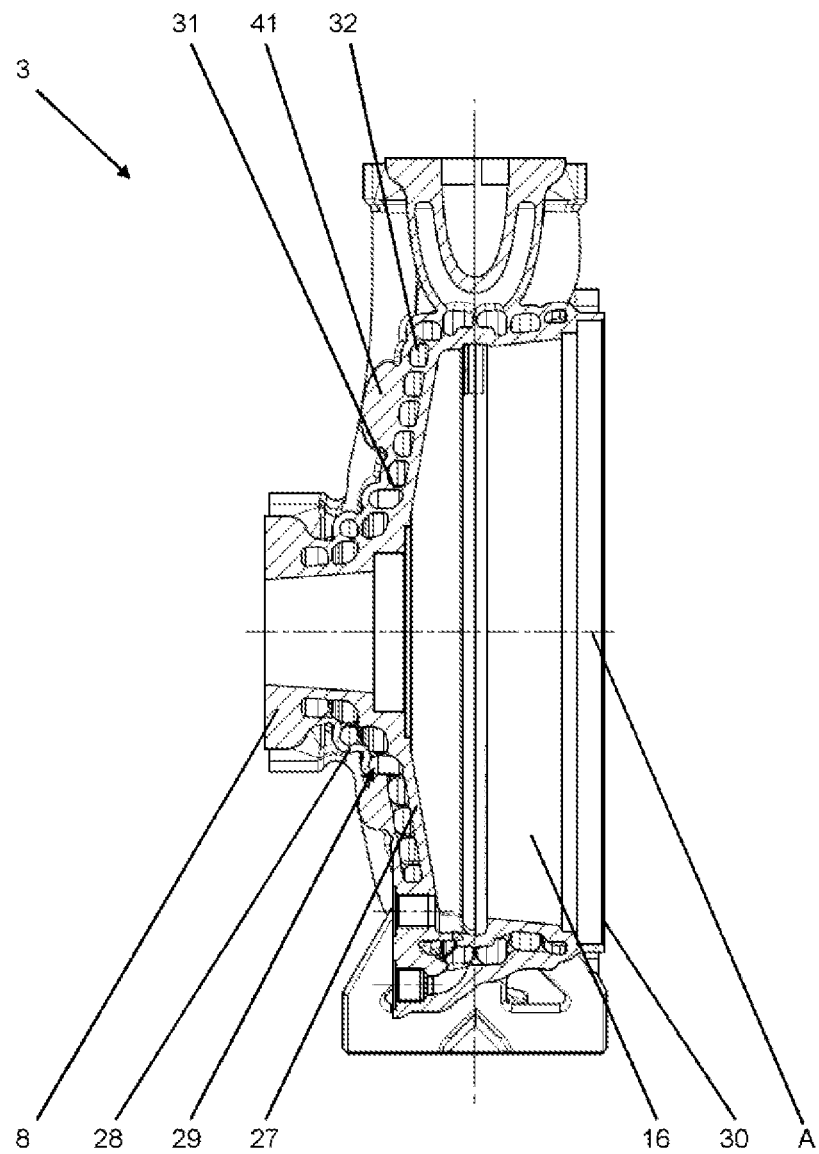
FIG. 2 is an enlarged longitudinal sectional view through the hydraulic casing according to FIG. 1.
Figure 3:
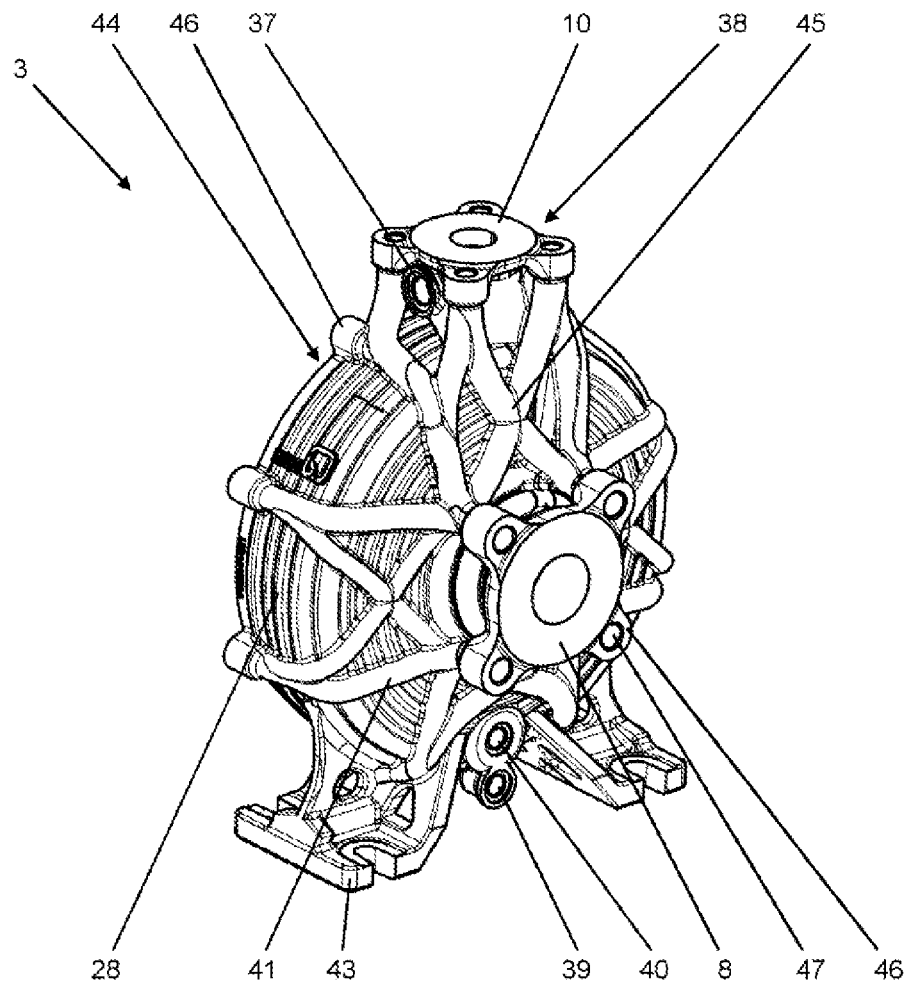
FIG. 3 is a perspective view of the hydraulic casing according to FIG. 2.
Figure 4:
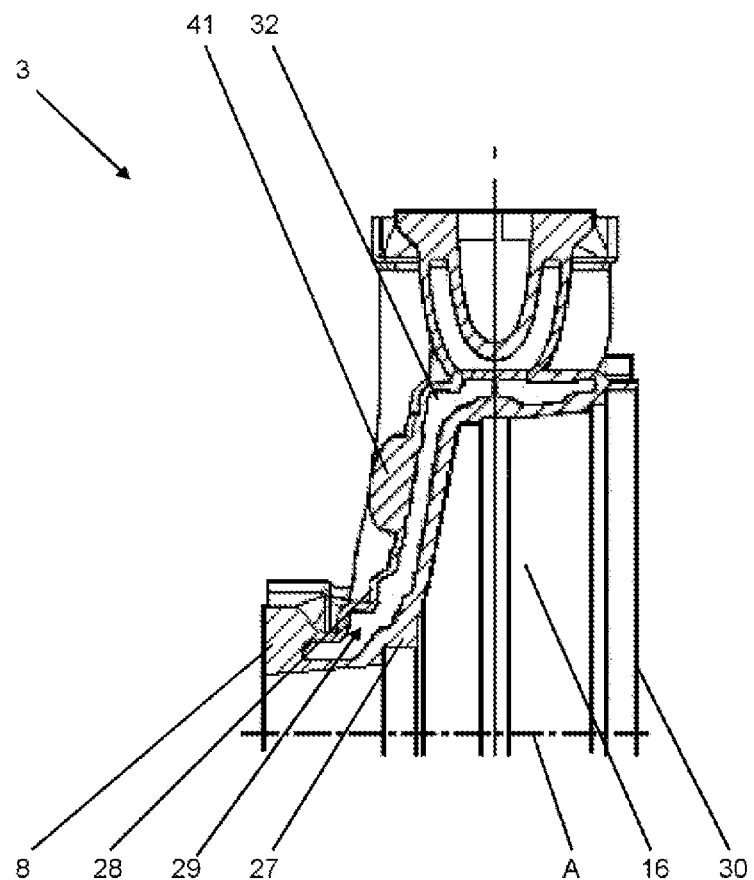
FIG. 4 is a longitudinal sectional view through an additional embodiment of the hydraulic casing.

FIGS. 2, 3 and 4 show exemplary embodiments of the hydraulic casing 3 in detail. The hydraulic casing 3 comprises an inner wall 27, and an outer wall 28 which is at a distance from the inner wall 27. The inner wall 27 and outer wall 28 form or define a temperature-control chamber 29. The temperature-control chamber 29 extends between the inner wall 27 and outer wall 28 and substantially over the part of the inner wall 27 defining the flow chamber 16. That is to say, from a surface 30 of the hydraulic casing 3 with which the casing cover 4 is in contact, over the entire hydraulic casing 3 as far as the suction pipe 8. In the exemplary embodiment shown, a plurality of struts 31 are provided in the temperature-control chamber 29, which struts connect the inner wall 27 to the outer wall 28. As a result, as shown schematically in FIG. 5, channels 32 extending in a circular shape are produced, which are arranged substantially concentrically with the axis of rotation A. If the struts are omitted, a channel 32 extending in a circular shape is produced, which in cross section, as shown in FIG. 4, has a substantially S-shaped curve profile.

Figure 5:
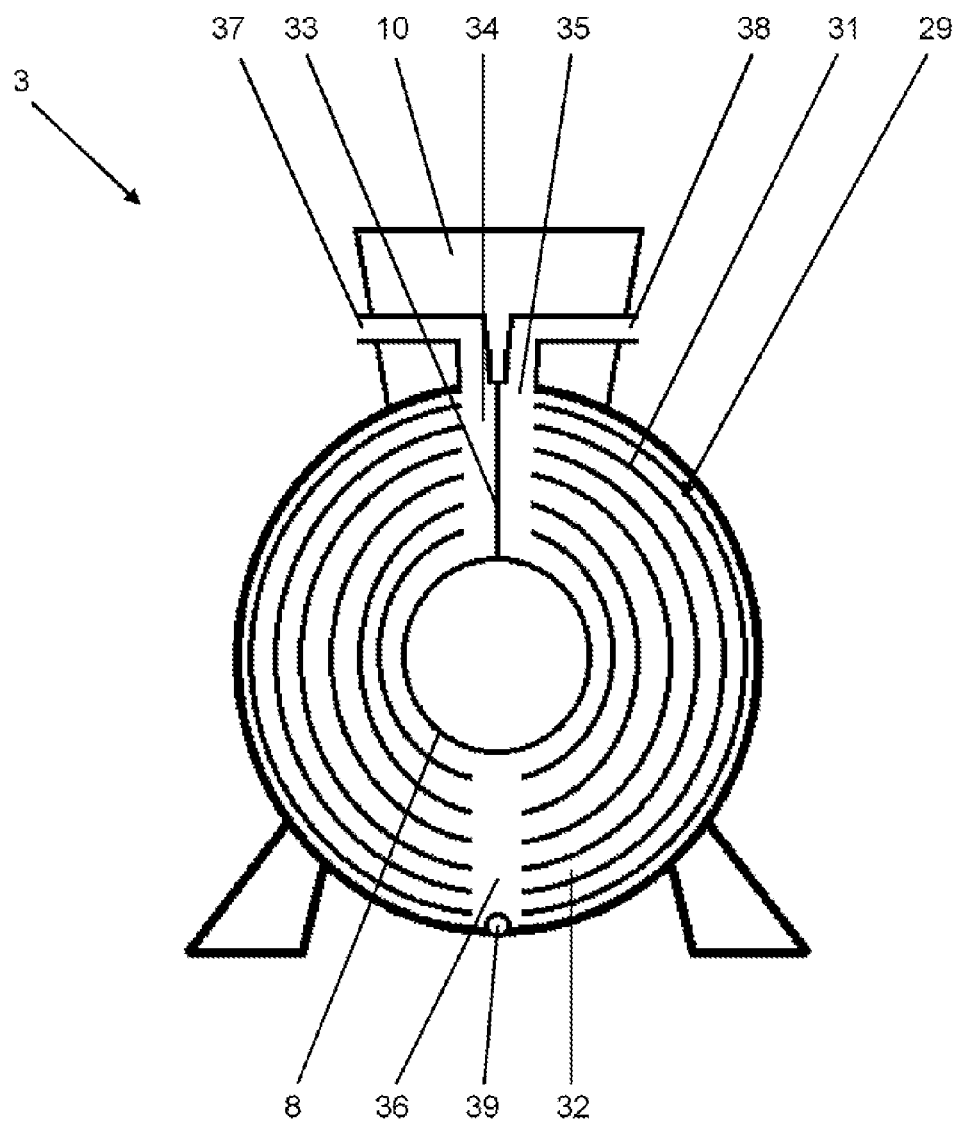
FIG. 5 is a schematic view of a hydraulic casing in accordance with an embodiment of the invention.

As shown in FIG. 5, in a region which extends from the suction pipe 8 to the pressure pipe 10, the struts 31 and the channels 32 are not continuous, that is to say they are interrupted. A connecting piece shown in FIG. 5, which extends from the pressure pipe 10 to the suction pipe 8, which connects the inner wall 27 and the outer wall 28, forms a dividing wall 33 in the temperature-control chamber 29. In this case, the struts 31 do not touch the dividing wall 33, so that, as shown schematically in FIG. 5, a first collection chamber 34 and a second collection chamber 35 are formed in the temperature-control chamber 29. The first collection chamber 34 and second collection chamber 35 comprise, starting from a region close to the suction pipe 8, a substantially radial extension, in particular towards the pressure pipe 10. In a radially extending region which, when the hydraulic casing 3 is stationary, is located underneath the suction pipe 8, the struts 31 likewise do not have a continuous design. A third collection chamber 36, which is shown schematically in FIG. 5, is formed thereby.

As shown in FIG. 3, a first connecting device 37 is provided on the pressure pipe 10, by means of which device a cooling or heating medium for controlling the temperature of, that is to say for cooling and/or heating the hydraulic casing 3, can flow into the temperature-control chamber 29. A second connecting device, to which the reference sign 38 refers, by means of which device the cooling or heating medium can flow back out of the temperature-control chamber 29, is arranged opposite the first connecting device 37. The arrangement of the second connecting device 38 can best be seen in FIG. 5.

The hydraulic casing 3 comprises a third connecting device 39 which is connected to the third collection chamber 36, which device is provided to completely empty the temperature-control chamber 29. The connecting device 39 is arranged in such a way that the temperature-control chamber 29 is emptied substantially in the axial direction. The connecting device 39 is designed to completely drain the contained cooling or heating medium at the lowest point of the temperature-control chamber 29.

The channel 32 or channels 32 comprise a defined structure O which is used to maximize turbulence in the cooling or heating medium and thus to maximize the heat exchange. In the exemplary embodiment shown, there are channels 32, which are for example circular, oval, substantially L or V-shaped or comprise depressions. The struts 31 can have for example a winged profile. The channel 32 or channels 32 and the struts 31 can also comprise bionic structures, for example a structure like sharkskin. In the embodiment shown by way of example, the outer wall 28 comprises, on the side pointing towards the external environment, a defined surface structure, in particular a corrugated surface structure.

As can be seen from FIGS. 2 and 3, the hydraulic casing 3 comprises a fourth connecting device 40, which is intended to completely empty the flow chamber 16. The connecting device 40 is arranged above the connecting device 39. The connecting device 40 is arranged in such a way that the flow chamber 16 is emptied substantially in the axial direction.

In order to cool or heat the hydraulic casing 3, the cooling or heating medium flows via the first connecting device 37 into the first collection chamber 34 of the temperature-control chamber 29 and from there into the individual channels 32 which are fluidically directly interconnected, then finally into the second collection chamber 35 and from there, out of the temperature-control chamber 29 via the second connecting device 38. In this process, a uniform temperature distribution over the hydraulic casing 3 is achieved.

It is understood that the cooling or heating medium can also be supplied to the temperature-control chamber 29 via the second connecting device 38 and flows out of the temperature-control chamber 29 via the first connecting device 37.

As shown in FIGS. 2 to 4, the hydraulic casing 3 additionally comprises a support structure 41 which absorbs and dissipates the forces and moments occurring on suction pipes 8 and pressure pipes 10. In addition, the hydraulic casing 3 is thereby reinforced, which minimizes the risk of the impeller 18 dragging against a split ring 42 shown in FIG. 1 or against part of the hydraulic casing 3. The support structure 41 formed on the outer wall 28 by accumulation of material thus supports and relieves pressure on both the relatively thin inner wall 27 and the relatively thin outer wall of the hydraulic casing 3. The support structure 41 interconnects defined construction elements of the hydraulic casing, in particular casing feet 43, suction pipes 8, pressure pipes 10 and connection points 44, to which additional components of the pump arrangement can be fixed, for example the casing cover 4.

The support structure 41 is designed to be optimized in terms of the flow of forces and in terms of topology. The support structure 41 comprises accumulations of material extending substantially horizontally, vertically and diagonally, which form interconnection or intersection points 45. Free ends 46 of the support structure 41 comprise blind holes 47, which are provided to receive fixing means (not shown), for example screws or threaded bolts.

Figure 6:
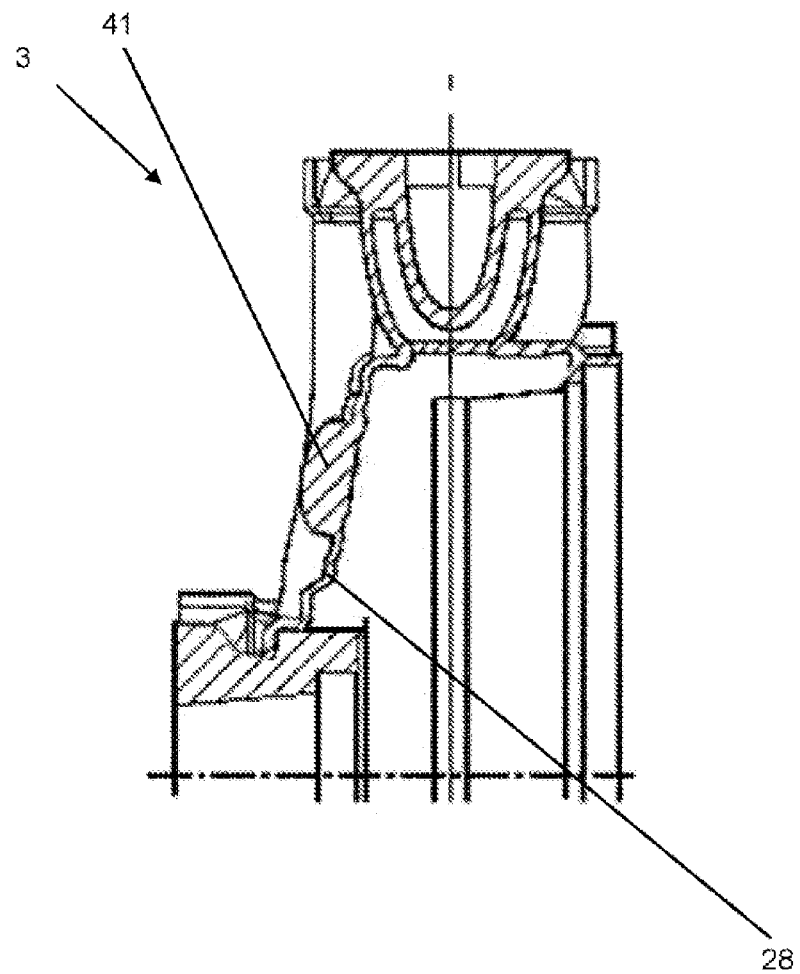
FIG. 6 is a longitudinal sectional view through an additional embodiment of the hydraulic casing of the invention having a relatively thin outer wall.

FIG. 6 shows a hydraulic casing according to the invention which an outer wall 28 which is relatively thin in comparison with conventional pumps and which is supported and relieved of pressure by a support structure 41 formed by means of accumulation of material.

In particular, FIG. 1 shows a pump arrangement 1 in the form of a magnetic drive pump arrangement. However, it can be seen that the hydraulic casing 3 according to the invention can be used in other pump arrangements, for example canned motor pumps or in-line pumps of any pumps without a magnetic drive.

The hydraulic casing 3 described above for a pump arrangement 1 is advantageously produced as an integral component by means of 3D-printing, in particular metal 3D-printing, selective laser melting (SLM) or by means of precision casting. For certain casing forms it is also possible to use a gravity casting method.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A pump arrangement, comprising:
   a hydraulic casing;
   a suction pipe on the hydraulic casing;
   a pressure pipe on the hydraulic casing;
   a flow chamber at least partially defined by the hydraulic casing; and
   an impeller arranged in the flow chamber, the impeller being drivable about an axis of rotation by an impeller shaft, wherein the hydraulic casing includes a support structure, wherein
     the support structure includes horizontally, vertically and diagonally extending accumulations of material which are integrally formed with an outer wall of the hydraulic casing, and which are thicker than a rest of the outer wall.

2. The pump arrangement as claimed in claim 1, wherein
   the support structure is configured to interconnect construction elements of the hydraulic casing to which additional components of the pump arrangement are fixable, and
   the interconnect construction elements include one or more of casing feet, suction pipes, pressure pipes and connection points.

3. The pump arrangement as claimed in claim 2, wherein the horizontally, vertically and diagonally extending accumulations of material form interconnection or intersection points.

4. The pump arrangement as claimed in claim 3, wherein free ends of the support structure include blind holes configured to receive fasteners.

5. The pump arrangement as claimed in claim 1, wherein
   the hydraulic casing includes an inner wall defining at least a portion of the flow chamber, and an outer wall at a distance from the inner wall in a direction parallel to a rotation axis of the impeller, and
   a temperature-control chamber is located between the inner wall and outer wall.

6. The pump arrangement as claimed in claim 4, wherein the hydraulic casing includes an inner wall defining at least a portion of the flow chamber, and an outer wall at a distance from the inner wall in an axial direction parallel to a rotation axis of the impeller, and
a temperature-control chamber is located between the inner wall and outer wall.

7. The pump arrangement as claimed in claim 6, wherein the temperature-control chamber extends between the inner wall and the outer wall, and
the temperature-control chamber extends in a radial direction relative to the rotation axis over at least a part of the inner wall defining the flow chamber.

8. The pump arrangement as claimed in claim 7, wherein at least one circular channel is located in the temperature-control chamber concentrically with the axis of rotation.

9. The pump arrangement as claimed in claim 8, wherein the hydraulic casing includes a plurality of struts located in the temperature-control chamber, and
the plurality of struts are configured to connect the inner wall to the outer wall (28) and form channels extending in a circular shape concentrically with the axis of rotation.

10. The pump arrangement as claimed in claim 9, wherein the hydraulic casing includes a first collection chamber and a second collection chamber are arranged in the temperature-control chamber, and
the first collection chamber and the second collection chamber extend from a region adjacent to the suction pipe to a region adjacent to the pressure pipe.

11. The pump arrangement as claimed in claim 10, wherein
the hydraulic casing includes a third collection chamber arranged between the suction pipe and a lower region of the hydraulic casing.

12. The pump arrangement as claimed in claim 11, further comprising:
a first connecting device configured to direct flow of a cooling medium or a heating medium into the temperature-control chamber to control a temperature of the hydraulic casing; and
a second connecting device configured to direct flow of the cooling or heating medium flows out of the temperature-control chamber.

13. The pump arrangement as claimed in claim 12, wherein at least one of the first connection device and the second connection device is on the pressure pipe.

14. The pump arrangement as claimed in claim 13, further comprising:
a third connecting device in fluid communication with the third collection chamber configured to permit emptying of the temperature-control chamber.

15. The pump arrangement as claimed in claim 14, wherein
the at least one circular channel is configured to maximize turbulence in the cooling medium or the heating medium.

16. A method for producing a hydraulic casing for a pump arrangement, the hydraulic casing including an inner wall defining at least a portion of a flow chamber and an outer wall at a distance from the inner wall in an axial direction, with a temperature-control chamber located between the inner wall and outer wall, comprising the step of:
forming the hydraulic casing as an integral component using 3D-printing, selective laser melting, precision casting or gravity casting; and
forming an outer wall of the hydraulic casing integrally with a support structure which includes horizontally, vertically and diagonally extending accumulations of material, wherein
at the accumulations of material, a thickness of the outer wall is thicker than at a rest of the outer wall.

17. The pump arrangement as claimed in claim 1, wherein the hydraulic casing includes a plurality of struts located in the temperature-control chamber, and the plurality of struts have a winged profile.

18. The method as claimed in claim 16, further comprising forming, in the hydraulic casing a plurality of struts located in the temperature-control chamber, wherein the plurality of struts have a winged profile.

19. A pump arrangement, comprising:
a hydraulic casing;
a suction pipe on the hydraulic casing;
a pressure pipe on the hydraulic casing;
a flow chamber at least partially defined by the hydraulic casing; and
an impeller arranged in the flow chamber, the impeller being drivable about an axis of rotation by an impeller shaft, wherein the hydraulic casing includes a support structure, wherein
the hydraulic casing includes a plurality of struts located in the temperature-control chamber, and the plurality of struts have a winged profile.

* * * * *